2,839,511

CYANO ETHER-ESTER COPOLYMERS

James O. Harris, St. Albans, W. Va., and Myron H. Wilt, Monroeville, Pa., assignors to Monsanto Chemical Company, St. Louis, Mo., a corporation of Delaware No Drawing. Application April 5, 1956
Serial No. 576,244

6 Claims. (Cl. 260—85.5)

The present invention relates to improvements in polymerizing cyano ether-esters and more particularly to copolymers thereof with small amounts of copolymerizable carboxylic acids.

Unsaturated cyano ether-esters and polymers prepared therefrom have been described by Mowry et al., U. S. Patent No. 2,669,558. The soft, rubbery polymers described have properties which render them especially suitable for a number of industrial applications but the use of these elastomers is limited by their low tensile strength. Moreover, polymerization yields erratic results and the preparation of an elastomer having uniform properties from batch to batch proved to be extremely difficult.

In accordance with the present invention it has been found that the addition of a small amount of an unsaturated carboxylic acid to the cyano ether-ester monomer and polymerization of the mixture increases very significantly both the tensile strength and uniformity of the vulcanizate. The resulting copolymer possesses uniform properties from batch to batch and has a high breaking strength. By cyano ether-esters are meant esters of acrylic acid having the formula

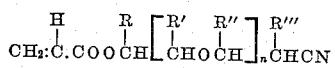

in which R, R', R'', and R''' are selected from the class consisting of hydrogen and the methyl radical and $n$ is an integer of from 1 to 3. The amount of acid should be in the range of 0.05% to 0.5% based on the cyano ether-ester. Above about 0.5% acid yields hard, resinous products deficient in rubbery properties and improvement is scarcely perceptible below about 0.05%. However, within the aforesaid range significant improvements are derived. While carboxylic acids are preferred, any copolymerizable molecule having a salt forming constituent appears to be suitable. Examples of suitable unsaturated carboxylic acids comprise acrylic acid, crotonic acid, maleic acid, methacrylic acid and cinnamic acid.

In order to obtain uniform results it is of course necessary to start with a reasonably pure monomer. Fractionation is usually insufficient and washing with caustic soda and salt solution is desirable. The crude product from the esterification reaction is preferably washed with water and then with sodium carbonate solution and subjected to direct take over distillation. If the acidity is greater than 0.5% the product is then washed with caustic soda and salt. For example, a solution of 6,000 parts by weight of 2-(2-cyanoethoxy)ethyl acrylate monomer prepared as described by Mowry et al. supra, in 3,000 parts by weight of toluene is washed with 950 parts by weight of an aqueous solution of 5% sodium hydroxide and 20% sodium chloride. The aqueous layer is separated after stirring thoroughly with the monomer solution and a second wash of 950 parts by weight of 20% sodium chloride added. After stirring for 15 minutes the layers are allowed to separate and the washing solution removed. The toluene is then stripped off by heating to a pot temperature of 81° C. under 26 mm. pressure. The residue is then fractionated after adding 60 parts by weight of hydroquinone to prevent polymerization. Substantially pure 2-(2-cyanoethoxy)ethyl acrylate, B. P. 154–156/15 mm. is obtained. The refractive index, $n_D^{25}$, should be within the range of 1.4500–1.4530 and the acidity not more than 0.10% calculated as acrylic acid.

A sample of 2-(2-cyanoethoxy)ethyl acrylate prepared as described above containing 0.1% acid calculated as acrylic acid was divided into several portions. To one portion was added 0.15% acrylic acid and polymerizations effected in the following recipe:

1200 parts distilled water
3 parts technical sodium lauryl sulfate (Duponol ME)
3 parts by weight of 2-ethylhexanol
0.3 part by weight of $K_2S_2O_8$
0.3 part by weight of $NaHSO_3$
300 parts by weight of monomer.

The water, sodium lauryl sulfate and 2-ethylhexanol were charged into a reactor fitted with a stirrer, thermometer, reflux condenser and dropping funnel and connected to a vacuum outlet. The mixture was refluxed under 70 mm. pressure at 44.5° C., the vacuum released and the catalyst charged after which the vacuum was again applied and the monomer gradually fed in at 43–44° C. over about an hour. The latex prepared from the untreated monomer and the latex prepared from the monomer to which 0.15% acrylic acid had been added were treated in exactly the same way. To each were added 85 parts by weight of carbon black, 28 parts by weight of finely divided $SiO_2$ and water. After dispersing the fillers into the latex, coagulation was completed by stirring in about 210 parts by weight of 5% sodium chloride solution. The coagulated, rubbery products were then washed and dried. The level of persulfate catalyst used in the above recipe is 0.1% based on the monomer. Similar preparations were carried out employing 0.2% catalyst and 0.3% catalyst, both with and without the addition of acrylic acid. In the run with 0.2% catalyst, 0.1% acrylic acid was added and in the run with 0.3% catalyst, 0.15% acrylic acid was added to the monomer.

From the admixtures of elastomers and fillers so prepared vulcanizable stocks were compounded comprising:

Filled elastomer_____ 141
Magnesium oxide_____ 20
Lead oxide_____ 5
Stearic acid_____ 3

The stocks were vulcanized by heating for different periods of time in a press at 330° C. The tensile strengths and elongations of the 60 minute cures, which are the optimum cures, are set forth in the table below:

Table I

| Catalyst Concentration | Ester Polymer | | Ester plus Acrylic Acid Copolymerized | |
|---|---|---|---|---|
| | Tensile Strength | Ultimate Elongation | Tensile Strength | Ultimate Elongation |
| 0.1 | 1,056 | 203 | 1,370 | 190 |
| 0.2 | 986 | 493 | 1,410 | 356 |
| 0.3 | 1,296 | 333 | 1,715 | 270 |

In addition to the increased tensile strength which is apparent from the above data, the individual samples from replicated polymerizations prepared from monomers to which a small amount of acrylic acid had been added varied considerably less in physical properties than similar preparations from the untreated monomers. While the acid content of the untreated monomer was calculated as acrylic acid, this is only a matter of convenience and is not necessarily justified otherwise. The same results cannot be obtained by controlling the acid content of the monomer at a specified level, as for example 0.1%. On the other hand, the advantages herein described may be achieved by preparing a substantially pure monomer containing no more than 0.05% acid and adding acrylic acid sufficient to bring the total acidity to 0.1%.

It is intended to cover all changes and modifications of the examples of the invention herein chosen for purposes of disclosure which do not constitute departures from the spirit and scope of the invention.

What is claimed is:

1. The process which comprises adding 0.05 to 0.5% of an unsaturated polymerizable carboxylic acid to a substantially pure cyano ether-ester having the formula

where R, R', R" and R'" are selected from the group consisting of hydrogen and methyl radicals, $n$ is an integer of from 1 to 3, and copolymerizing the mixture.

2. The product prepared by the process of claim 1.

3. The process which comprises adding 0.05 to 0.5% of an unsaturated polymerizable carboxylic acid to a substantially pure 2-(2-cyanoethoxy)ethyl acrylate and copolymerizing the mixture.

4. The product prepared by the process of claim 3.

5. The process which comprises adding acrylic acid to substantially pure 2-(2-cyanoethoxy)ethyl acrylate containing not more than 0.05% acid calculated as acrylic acid in amount sufficient to increase the total acidity to at least 0.1% but not more than about 0.5% and copolymerizing the mixture.

6. The product prepared by the process of claim 5.

References Cited in the file of this patent

UNITED STATES PATENTS

| | | |
|---|---|---|
| 2,265,236 | Kistler | Dec. 9, 1941 |
| 2,669,558 | Mowry et al. | Feb. 16, 1954 |
| 2,687,402 | Wesp et al. | Aug. 24, 1954 |
| 2,720,512 | Butler | Oct. 11, 1955 |
| 2,772,251 | Hansen et al. | Nov. 27, 1956 |